United States Patent

[11] 3,552,701

| [72] | Inventor | Anthony Montagano<br>45 Eastview Ave., Pleasantville, N.Y. 10570 |
|---|---|---|
| [21] | Appl. No. | 741,955 |
| [22] | Filed | July 2, 1968 |
| [45] | Patented | Jan. 5, 1971 |

[54] INTERIOR AUTO MIRROR SUPPORT FOR SUNGLASSES OR THE LIKE
9 Claims, 7 Drawing Figs.

[52] U.S. Cl. ................................................. 248/309,
206/5; 211/13
[51] Int. Cl. ..................................................... A47f 5/00
[50] Field of Search ........................................... 248/309,
315, 481, 316, 314, 229, (EH. Digest); 287/89;
24/81, 73T; 211/13; 206/5

[56] References Cited
UNITED STATES PATENTS
| 1,241,922 | 10/1917 | Chappell .................... | 248/229X |
| 1,490,304 | 4/1924 | Zink .......................... | 287/89X |
| 1,931,286 | 10/1933 | Drew .......................... | 248/229UX |
| 2,930,567 | 3/1960 | Lloyd-Young .............. | 248/309 |
| 2,949,683 | 8/1960 | Glover ........................ | 248/309X |
| 2,918,959 | 12/1959 | Bloch .......................... | 206/5X |
| 3,381,806 | 5/1968 | McDonagh .................. | 206/5 |

*Primary Examiner*—Roy D. Frazier
*Assistant Examiner*—J. Franklin Foss
*Attorney*—Alfred E. Miller

ABSTRACT: An interior auto mirror sunglass support which may be adjustable for various configurations of mirror support posts. The support may be integrally incorporated in new interior mirror constructions or incorporated with existing auto mirrors. The support either is removably secured to a mirror support post or is fixed on the mirror frame itself.

BY
ANTHONY MONTAGANO
*INVENTOR.*

INVENTOR.
ANTHONY MONTAGANO

INTERIOR AUTO MIRROR SUPPORT FOR SUNGLASSES OR THE LIKE

BACKGROUND OF THE INVENTION

It is a well-known fact that many automobile drivers wear sunglasses. However, there are many occasions in which it is necessary to remove the sunglasses and the problem arises as to where these glasses can be safely supported and stored. If the sunglasses are placed on the automobile seat there is the danger that someone may sit on them or that very young children may handle and break them. If the sunglasses are placed on the top of the dashboard there is the possibility that the glasses may fall off when the automobile or vehicle commences to move. In addition, sunglasses resting on the top of the dashboard may obstruct the view of the driver through the windshield.

SUMMARY OF THE INVENTION

It is an object of the present invention to overcome the problem of the placement of sunglasses or the like when not used. To accomplish the foregoing an adjustable support has been innovated which is removably attached to the interior automobile mirror support post.

Another object of the present invention is to provide an interior automobile support for sunglasses in which the glasses are held by gravity on the support without the danger of the glasses being dislodged from their support. The support may be tilted or adjusted so that the glasses present no obstruction to the mirror and no meaningful obstruction to the vision through the automobile windshield.

It is a further object of the present invention to provide an interior automobile mirror support for sunglasses or the like which can be installed on automobiles currently in use and may also be integral with automobile mirrors on new automobiles or other vehicles.

It is an object of the present invention to provide spaced loops on a crosspiece of an interior mirror support for sunglasses, or to provide U-shaped holding members for the bows of sunglasses.

It is a further object of the present invention to provide a support for sunglasses which may be secured to an automobile mirror support post of the type that projects from the windshield or dashboard in a generally horizontal plane.

It is an object of the present invention to provide an automobile interior sunglasses support which is relatively inexpensive to construct, easy to install and adjust, and is reliably effective for the purposes intended.

The above and other features, objects and advantages of the present invention will be fully understood from the following description considered in connection with the accompanying illustrative drawings in which:

DESCRIPTION OF THE PREFERRED EMBODIMENTS

Figure 1:
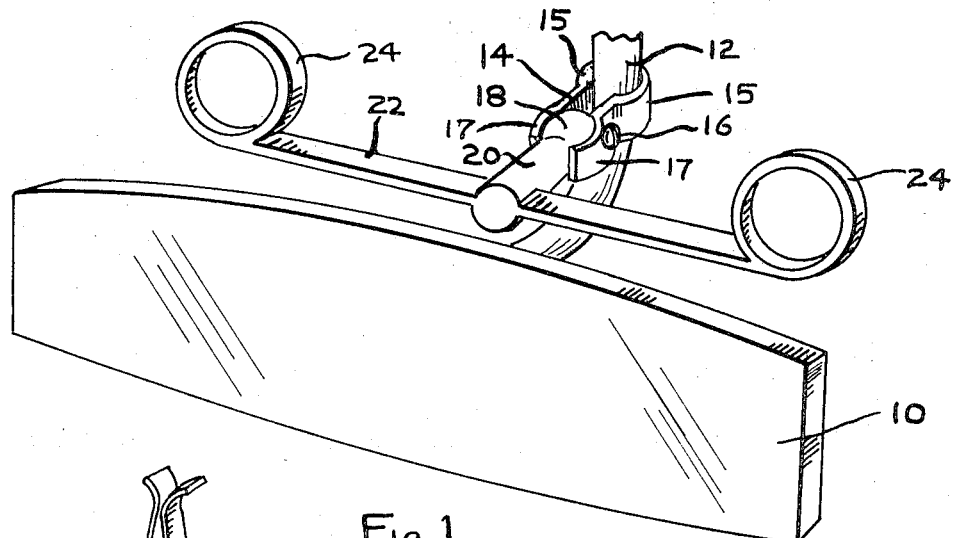
FIG. 1 is a perspective view of the interior automobile mirror support for sunglasses or the like constructed in accordance with the teachings of my invention.

Referring to the drawings and especially FIG. 1 thereof, an automobile interior mirror of the well-known type is referred to generally by the reference numeral 10. The mirror 10 is adjustably secured to a mirror post 12. The post 12 is generally L-shaped and has its end remote from the mirror secured to the automobile interior roof at the area where the roof meets the upper part of the windshield.

The present device takes the form of a double-ended clamp 14 provided with a tension adjusting screw 16. The jaws 15 of the clamp 14 are adapted to engage the mirror post 12 while the jaws 17 are adapted to engage a swivel ball 18 of shaft 20. A transverse crosspiece or bridge 22 is shown connected to shaft 20 and at the remote ends thereof is provided with annular loops 24. It should be noted that since the swivel ball 18 is removably gripped within the jaws 17 a universal joint is formed which permits manual omnidirectional adjustment of the crosspiece 22 with its loops 24, thereby permitting the user to adjust the support for sunglasses or the like to any desired attitude.

Figure 2:
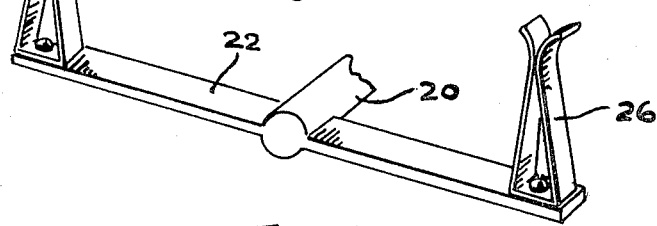
FIG. 2 is a perspective view of an alternate embodiment of the interior automobile mirror support shown in FIG. 1.

FIG. 2 illustrates an alternate construction of the interior automobile mirror support for sunglasses shown in FIG. 1. Instead of loops being spatially arranged on the crosspiece 22 as shown in FIG. 1, spaced, substantially U-shaped retaining or holding elements 26 are utilized. This construction permits the user to insert the bows of the sunglasses or the like down through the openings formed in the U-shaped elements 26 instead of inserting the same through the closed loops 24 shown in FIG. 1. In either case, when the bows of the glasses are in place on the support, the glasses are retained on the support and are not subject to being dislodged.

Figures 3, 4:
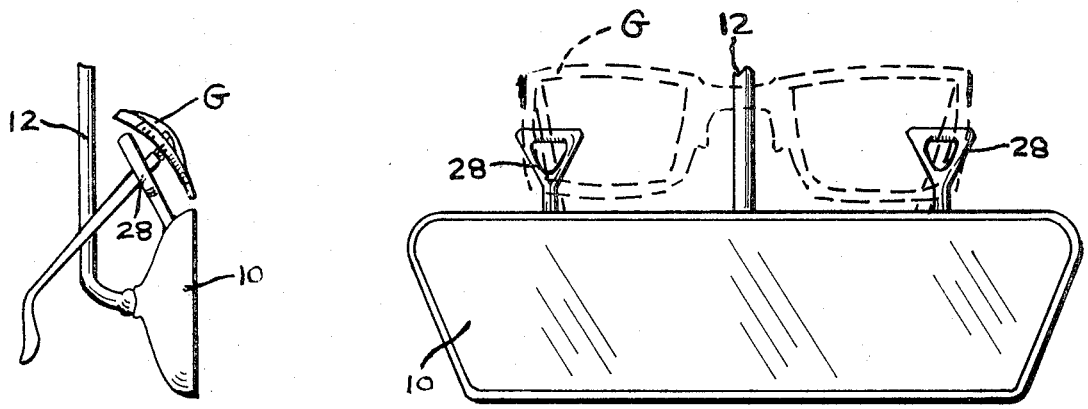
FIGS. 3 and 4 illustrates a further alternate embodiment of the structure shown in FIG. 1, in a front elevation view and a side elevation view respectively.

FIG. 3 shows a further form of construction of an interior automobile support for sunglasses as illustrated in FIG. 1 in which inverted triangular-shaped holding members 28 are spatially arranged and tilted backwards on crosspiece 24. It should be noted that in this construction, since the apices of the holding members 28 face downwardly, the bows of the glasses will rest securely in these apices. The holding members 28 are preferably integral with the mirror 10. Thus, this structure is particularly adaptable for use in automobiles to be manufactured instead of being utilized in automobiles currently being used. A pair of sunglasses G is shown in position in dashed lines in FIG. 3 and in full lines in FIG. 4.

Figure 5:
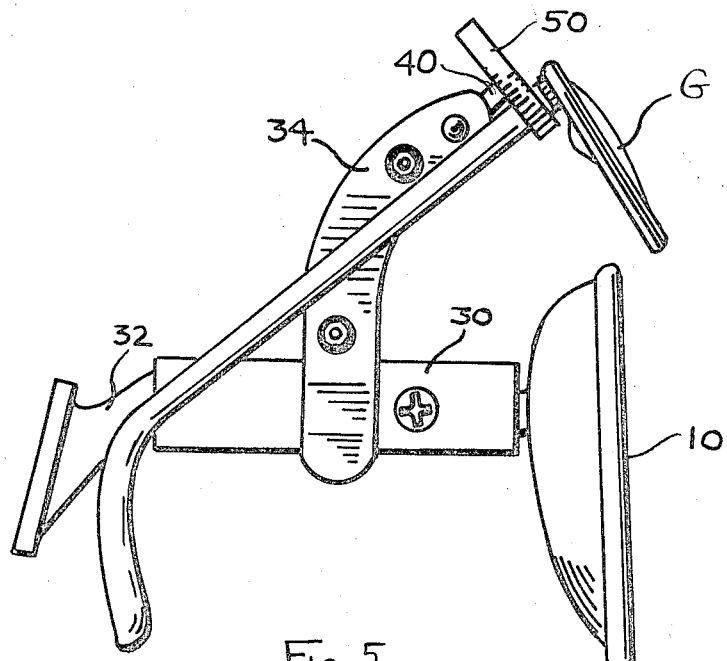
FIG. 5 is a side elevation view of another embodiment of the construction shown in FIG. 1 in which the mirror support post is in a generally horizontal plane.
Figure 6:
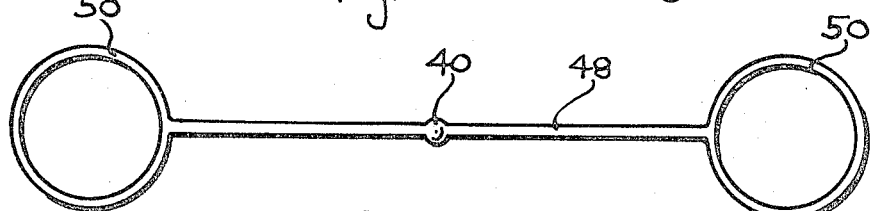
FIG. 6 is a front elevation view of the sunglass support means shown in FIG. 5.
Figure 7:
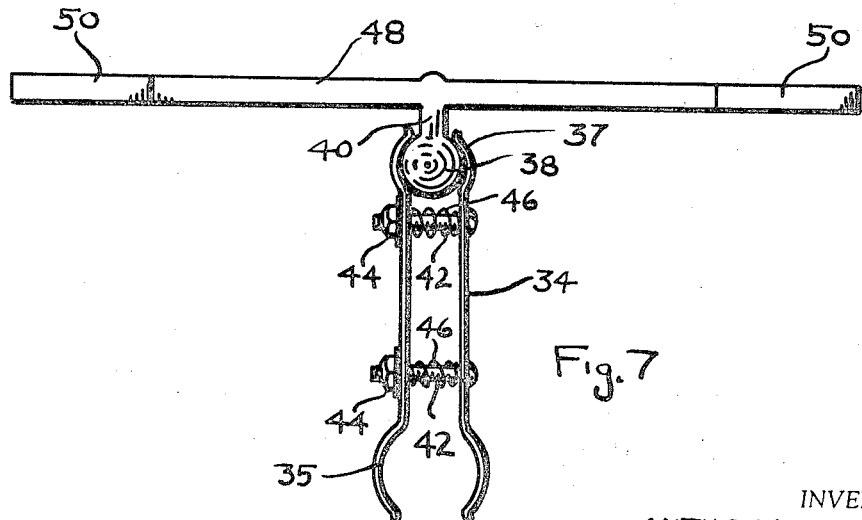
FIG. 7 is a top plan view of the support means shown in FIG. 6.

FIGS. 5, 6 and 7 show a support for sunglasses or the like in which the mirror support post 30 is disposed in a horizontal plane. The post 30 is secured to the windshield of an automobile by means of a connecting element 32. It is also within the scope of the present invention to have the connecting element 32 mounted on the dashboard of a vehicle. The support for the sunglasses in FIGS. 5 and 7 takes the form of an arcuate double-ended clamp 34 having a pair of jaws 35 gripping the mirror support post 30 and another pair of jaws 37 gripping a swivel ball 38 on one end of stub shaft 40. Threaded bolts 42 with nuts 44 and helical springs 46 form the tensioning means for the pairs of jaws 35 and 37 respectively. A crosspiece 48 is connected to stub shaft 40 but is perpendicular thereto. At the extreme ends of crosspiece 48 are located circular elements 50 which are bow retaining means for sunglasses.

It should be apparent that although the present support is particularly adapted for storing and retaining sunglasses in a fixed position on the interior vehicle mirror structure, it is within the scope of the invention to provide this support for ordinary eyeglasses or other special purpose glasses without scratching or otherwise defacing the lenses or frames of the glasses.

While I have shown and described and preferred embodiments of my invention, it will be understood that the latter may be embodied otherwise than as herein specifically illustrated or described and that in the illustrated embodiments certain changes in the details of construction and in the arrangement of the parts may be made without departing from the underlying idea or principle of the invention.

I claim:

1. An interior auto mirror support for sunglasses or the like comprising means structurally connected to said mirror for holding the bows of sunglass frames, said means constituting a pair of spaced, enclosed, substantially annular rigid members for receiving said bows of the sunglass frames, and a rod connected at one end to said structural means extending substantially transversely to the plane of said mirror support, and means connecting the other end of said rod for permitting adjustment of said rod relative to said mirror support.

2. An interior mirror support for sunglasses or the like clamped to the support post of said mirror comprising a rod extending transversely to the plane of said mirror support post and being provided with a swivel ball at one end thereof, a double-ended clamp having first jaws at one end for gripping said support post and second jaws at the other end thereof for gripping said swivel ball, a crosspiece connected to the other end of said rod, and a structural member at opposite ends of said crosspiece at least substantially enclosing a space therein, each of the bows of said sunglasses fitting and retained in said spaces.

3. An interior mirror support for sunglasses or the like as claimed in claim 1 wherein said means for holding the bows of said sunglasses are spaced, substantially U-shaped elements.

4. An interior mirror support for sunglasses or the like as claimed in claim 1 wherein said means for holding the bows of said sunglasses are integral with said interior mirror.

5. An interior mirror support for sunglasses or the like as claimed in claim 4 wherein each of said means for holding the bows of said sunglasses is in the form of an inverted triangle.

6. An interior mirror support for sunglasses or the like as claimed in claim 2 wherein said structural members are in the form of closed loops.

7. An interior mirror support for sunglasses or the like as claimed in claim 2 wherein said mirror is provided with a post extending generally in a horizontal plane, and wherein said double-ended clamp is generally perpendicular thereto with said structural members disposed in a plane forward of the plane of said clamp.

8. An interior mirror support for sunglasses or the like as claimed in claim 7 wherein said double-ended clamp is arcuate.

9. An interior auto mirror support for sunglasses or the like as claimed in claim 1 wherein said means structurally connected to said mirror for holding the bows of sunglass frames is a rod extending substantially transversely to the plane of said mirror post, a clamp at one end of said rod for gripping said support post, a crosspiece connected to the other end of said rod for gripping said support post, a crosspiece connected to the other end of said rod, and a structural member at opposite ends of said crosspiece at least substantially enclosing a space therein, each of the bows of said sunglasses fitting and retained in said spaces.